Oct. 18, 1949.　　　　　K. WILLIAMS　　　　　2,485,425
HAND BRAKE
Filed July 29, 1946　　　　　　　　　　　　2 Sheets-Sheet 1
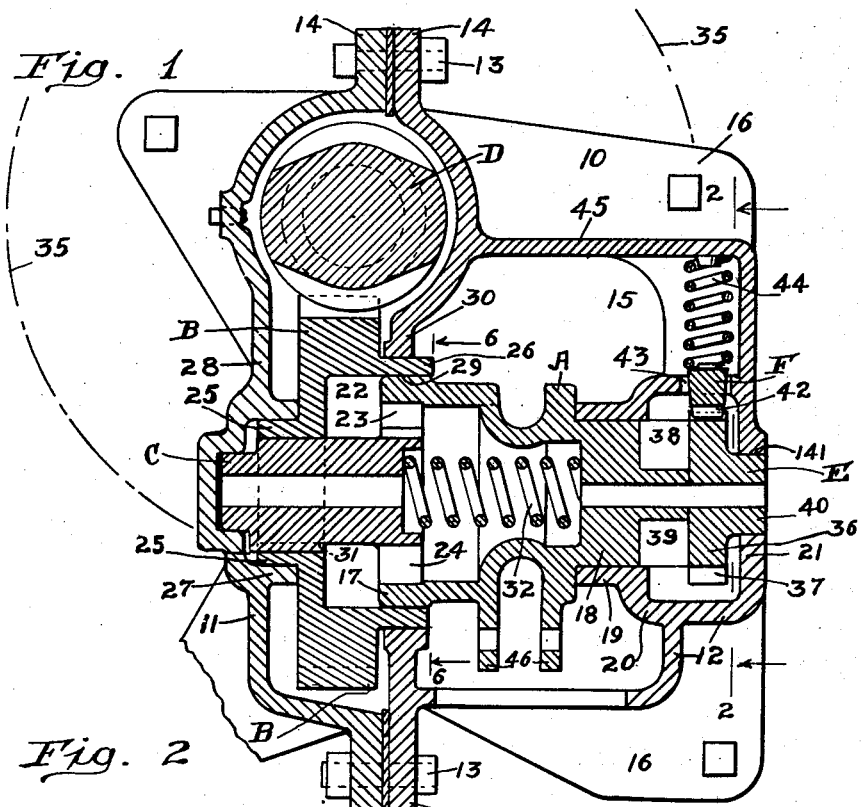
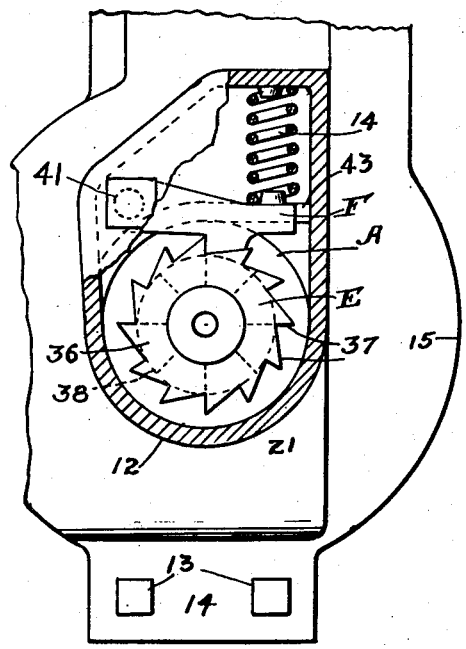
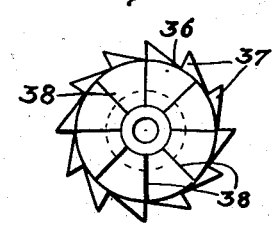
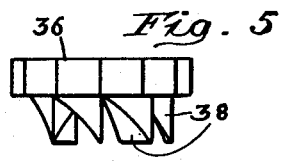
Inventor:
Keith Williams.
By George I. Haight
Atty.

Oct. 18, 1949.  K. WILLIAMS  2,485,425
HAND BRAKE
Filed July 29, 1946  2 Sheets-Sheet 2
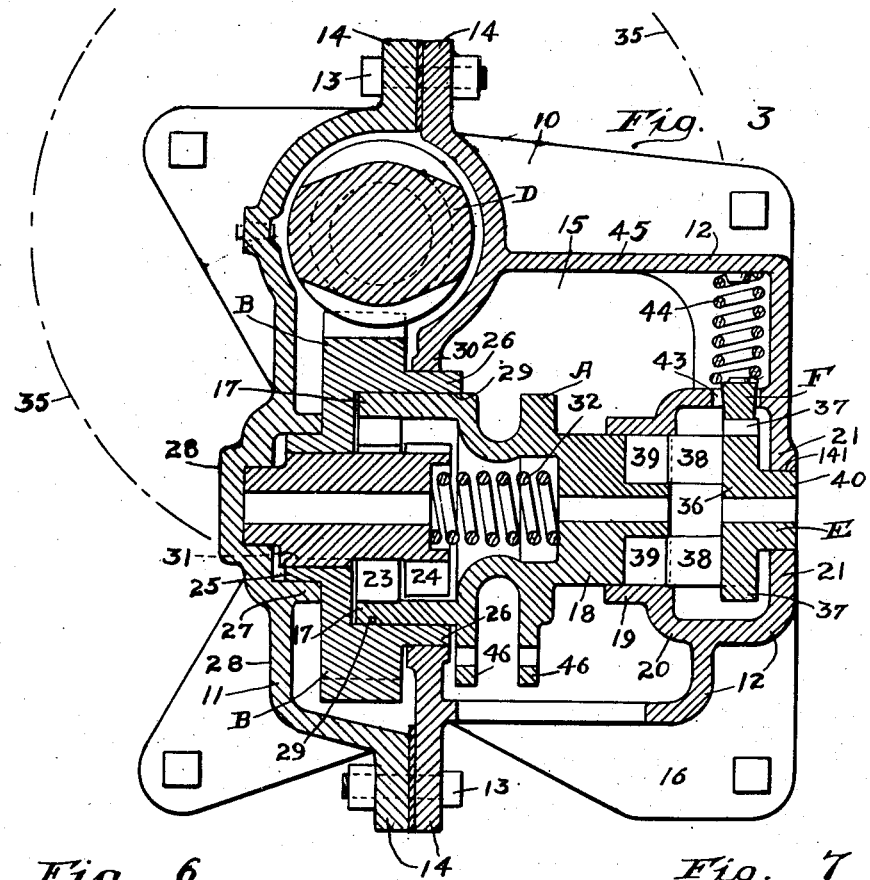
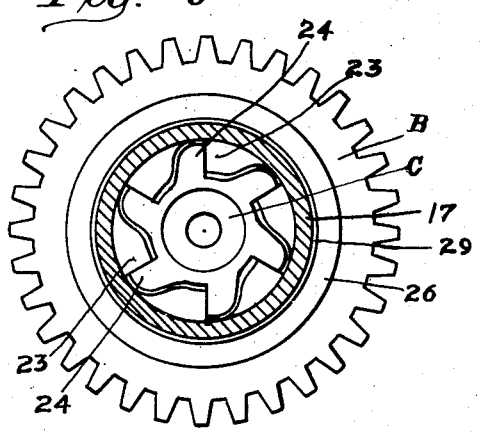
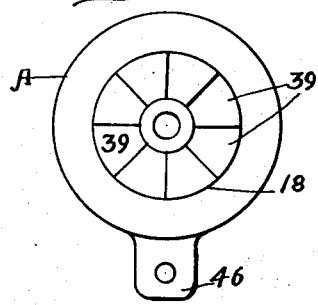
Inventor:
Keith Williams.
By George D Haight
Atty.

Patented Oct. 18, 1949

2,485,425

UNITED STATES PATENT OFFICE 2,485,425

HAND BRAKE

Keith Williams, Buffalo, N. Y.

Application July 29, 1946, Serial No. 686,814

9 Claims. (Cl. 74—505)

This invention relates to improvements in hand brakes for railway cars.

One object of the invention is to provide a hand brake mechanism comprising a chain-winding drum, a rotary driving element actuated by the usual hand wheel, and clutch means connecting the drum to the driving element, wherein simple and efficient means is provided for automatically disengaging the clutch means through rotation of the hand wheel in chain-unwinding direction to permit free rotation of the drum, thereby effecting quick release of the brakes.

A further object of the invention is to provide a mechanism as set forth in the preceding paragraph wherein the means for automatically disengaging the clutch means comprises a clutch shifting element rotatable in unison with the driving element and chain-winding drum during tightening of the brakes, which is locked against rotation with respect to the driving element and drum during rotation of the latter in chain-unwinding direction to effect shifting of the clutch means to disengaged position.

A still further object of the invention is to provide a hand brake mechanism comprising a chain-winding drum and a rotary driving element having clutch teeth engaged with clutch teeth on the drum, wherein the drum is shiftable with respect to the driving element to disengage the clutch teeth thereof and effect quick release of the brakes by permitting free rotation of the drum.

Other objects of the invention will more clearly appear from the description and claims hereinafter following.

In the accompanying drawings, forming a part of this specification,

Fig. 1 is a vertical sectional view through a hand brake mechanism, illustrating my improvements in connection therewith, the section being in a plane parallel to the end wall of the car on which the mechanism is mounted;

Fig. 2 is a vertical sectional view, partly broken away, corresponding substantially to the line 2—2 of Fig. 1;

Fig. 3 is a view similar to Fig. 1, showing the parts of the mechanism in position with the clutch means thereof disengaged;

Fig. 4 is an end elevational view of the clutch shifting member of my improved mechanism, looking from left to right in Fig. 1;

Fig. 5 is a plan view of Fig. 4;

Fig. 6 is a transverse, vertical sectional view, corresponding substantially to the line 6—6 of Fig. 1, the housing wall being omitted in said view; and Fig. 7 is an end elevational view of the winding drum, looking from right to left in Fig. 1.

As shown in said drawings, my improved hand brake mechanism is preferably enclosed within a two-part, vertically divided housing 10, comprising sections 11 and 12. Each section of the housing is in the form of a hollow chamber. The sections 11 and 12 are secured to each other by bolts 13 extending through suitable flanges 14—14 on said sections. The back wall of the housing 10, which wall is indicated by 15, is extended laterally outwardly of the housing proper to provide securing lugs or flanges 16 for mounting the mechanism on the end wall of a railway car.

My improved brake mechanism proper, as illustrated in the drawings, comprises broadly a chain-winding drum A; a worm wheel B; a clutch element C fixed to the worm wheel and operatively connecting the drum to the worm wheel; a worm D meshing with the worm wheel and actuated by the usual hand wheel of the brakes; a rotatable cam element E cooperating with the drum; and a spring-pressed locking pawl F for holding the cam element against rotation to effect shifting of the drum to disengaged position with respect to the clutch element and worm wheel.

The chain-winding drum A is rotatably mounted within the housing section 12, having cylindrical hub portions 17 and 18 at opposite ends thereof for supporting the same. The hub portion 18, which is in the form of a solid cylindrical extension, is journaled in a sleevelike bearing member 19 extending from a boxlike compartment 20 formed on the righthand side wall 21 of the housing section 12, as seen in Fig. 1. The hub portion 17, which is of larger diameter than the hub portion 18, is supported by the worm wheel B, the latter being provided with a cylindrical bearing opening or seat 22 within which the hub portion 17 is journaled. The hub 17 is hollow and is provided with internal clutch teeth 23, which cooperate with clutch teeth 24 on the clutch element C.

In addition to supporting the drum A for rotation, the bearings formed by the sleevelike member 19 and the seat 22 of the worm wheel accommodate the drum for endwise sliding movement, for a purpose hereinafter pointed out.

The worm wheel B has hollow hub portions 25 and 26 at opposite sides thereof, by which it is supported, the hub portion 25 being journaled in a bearing member 27 on the inner side of the lefthand side wall 28 of the housing 10, as seen in Fig. 1. The hub portion 26 is journaled in a bearing opening 29 provided in a vertical partition wall 30 formed on the section 12 of the housing and separating the chambers provided by the sections 11 and 12 of the housing.

The clutch element C is fixed to the worm wheel B for rotation therewith, the left-hand end portion of the element C fitting within the hollow hub portion 25 of the worm wheel and being locked thereto by a key member 31 which, as shown, is integral with the clutch element C. The clutch element C normally projects into the hollow end of the drum A and has the teeth 24 thereof interlocked with the teeth 23 of the drum. As will be evident, although the clutch element C, as illustrated in the drawings, is a separate member which is fixed to the worm wheel B, it may be formed as an integral part of the worm wheel. In other words, the worm wheel is, in effect, provided with the clutch teeth 24, which directly engage with the clutch teeth of the drum. A spring 32, arranged within the drum A and having its opposite ends bearing on the inner end of the clutch element C and the inner end of the solid hub portion 18 of the drum, yieldingly holds the latter in position with the clutch teeth thereof engaged with the clutch teeth of the element C.

The worm D, which meshes with the worm wheel B, is arranged above the latter, being rotatably supported by suitable bearing members (not shown) provided in the housing 10. The worm D is rotated by the usual hand wheel, not shown but indicated by the dotted line 35 in Figs. 1 and 3.

The cam element E includes a heavy disclike ratchet wheel member 36 having peripheral ratchet teeth 37. On the inner side thereof, the disclike member or ratchet wheel 36 carries an annular series of cam projections or teeth 38, which cooperate with complementary cam projections or teeth 39 on the hub 18 of the drum A. The projections 38 and 39 have shouldered engagement with each other to effect rotation of the element E with the drum A in chain-winding direction. The cooperating cam faces of the projections 38 and 39 are inclined so that when the drum A is rotated in chain-unwinding direction with respect to the cam element E the drum will be shifted to the left from the position shown in Fig. 1 to the position shown in Fig. 3, thereby disengaging the clutch teeth 23 of the drum from the clutch teeth 24 of the element C.

The cam element E is arranged in the boxlike compartment 20 in axial alignment with the drum A, being rotatably supported by a hub portion 40 on the outer side thereof journaled in a bearing opening 141 in the side wall 21 of the housing.

The locking pawl F is arranged above the cam element E, being pivoted at one end, as indicated at 41, and having a tooth 42 at its other end cooperating with the teeth of the ratchet wheel 36 of the cam element E. The upper wall of the boxlike compartment 20 is slotted, as indicated at 43, to accommodate the pawl for swinging movement toward and away from the ratchet wheel 36. A spring 44 reacting between the top wall 45 of the housing 10 and the outer end of the pawl yieldingly holds the latter engaged with the teeth 37 of the cam element E. The locking pawl F cooperates with the ratchet teeth 37 of the cam element E to hold the latter against rotation in a direction corresponding to the unwinding direction of the chain-winding drum.

The operation of my improved hand brake mechanism is as follows: To apply the brakes, the worm D is rotated in clockwise direction, as viewed in Fig. 1, thereby rotating the worm wheel in clockwise direction, as viewed from the left-hand side of said figure, thereby rotating the clutch element C in the same direction and through engagement of the teeth 24 thereof with the teeth 23 of the drum actuating the latter to wind the chain thereon. As is well known to those skilled in this art, the brake chain, which is not shown in the drawings, has one end thereof anchored to the usual chain-anchoring lugs 46 of the drum and the other end connected to the brake mechanism proper of the car. During the winding operation, the cam element E will be rotated in unison with the drum A through the interengaging cam projections 38 and 39. At this time, the pawl F ratchets over the ratchet teeth of the cam element E but prevents backward rotation of this element. To effect release of the brakes, the worm D is rotated in a direction reverse to that hereinbefore described, thereby rotating the worm wheel B in contraclockwise direction, as viewed from the left side of Fig. 1. Inasmuch as the drum A is at this time in clutching engagement with the element C, the drum will be rotated in the same direction or in clockwise direction, as viewed in Fig. 2, thereby unwinding the chain. As the cam element E is locked against backward rotation by the pawl F and remains stationary, this rotation of the drum in chain-unwinding direction causes the cam projections 39 of the drum to ride up on the cam projections 38 of the element E, sliding the drum to the left, as viewed in Fig. 1, until the clutch teeth thereof become disengaged from the clutch teeth of the element E, as shown in Fig. 3. The drum is thus freed for rotation with respect to the other mechanism, thereby permitting unwinding of the chain without rotation of the hand wheel and the other parts of the driving means. As will be evident, the extent to which the brakes may be backed off or released by rotation of the hand wheel before complete release is obtained by free rotation of the drum, is dependent upon the number and pitch of the cooperating cam projections 38 and 39 on the cam element and drum. This cam means is preferably designed so that the amount of backward rotation of the hand wheel, which is permitted before quick complete release of the brakes is obtained, will effect easing off or backing off of the brakes to a sufficient extent to take care of the usual switching operations.

I claim:

1. In a hand brake mechanism, the combination with a rotary chain-winding member; of a rotary driving member; interengaging clutch means on said members; a clutch-shifting element rotatable in unison with said members in chain-winding direction; means for holding said shifting element against rotation during rotation of said members in chain-unwinding direction; and cooperating means on said clutch-shifting element and one of said members for shifting the latter by rotation thereof in chain-unwinding direction to disengage said clutch means.

2. In a hand brake mechanism, the combination with a rotary chain-winding member; of a rotary driving member; interengaging clutch means on said members; a clutch-shifting element rotatable in unison with said members in chain-winding direction; latch means for holding said shifting element against rotation during rotation of said members in chain-unwinding direction; and cooperating cam faces on said shifting element and one of said members for shifting the latter by rotation thereof in chain-unwinding direction to disengage said clutch means.

3. In a hand brake mechanism, the combination with a rotary chain-winding member; of a rotary driving member; interengaging clutch means on said members; a ratchet wheel rotatable in unison with said members in chain-winding direction; a locking pawl having locking engagement with said ratchet wheel to hold the same against rotation during rotation of said members in chain-unwinding direction; and cooperating cam projections on said ratchet wheel and one of said members for shifting the latter by rotation thereof in chain-unwinding direction to disengage said clutch means.

4. In a hand brake mechanism, the combination with a rotary chain-winding member provided with clutch teeth; of a rotary driving member having clutch teeth engageable with the teeth of the winding member to rotate the latter; a ratchet wheel rotatable in unison with said members in chain-winding direction; a locking pawl for holding said ratchet wheel against rotation during rotation of said members in chain-unwinding direction; and cooperating cam projections on said ratchet wheel and one of said members for shifting the latter by rotation thereof in chain-unwinding direction to disengage the clutch teeth thereof from the clutch teeth of the other member.

5. In a hand brake mechanism, the combination with a rotary chain-winding drum; of a rotary driving member coaxial with said drum; interengaging clutch means on said drum and driving member; a ratchet wheel rotatable in unison with said drum in chain-winding direction; and cooperating cam projections on said drum and ratchet wheel for shifting the drum by rotation thereof in chain-unwinding direction to disengage said clutch means.

6. In a hand brake mechanism, the combination with a worm gear; of a worm member for driving said worm gear; a rotatable, axially slidable, chain-winding drum coaxial with said gear; a clutch element fixed to said worm member coaxial therewith and normally operatively connecting the drum to the worm gear for rotation therewith in unison; a rotatable ratchet wheel coaxial with said drum; a locking pawl for locking the ratchet wheel against rotation in chain-unwinding direction; and interengaging cam projections on said drum and ratchet wheel having shouldered engagement with each other to effect rotation of said ratchet wheel in unison with said drum in chain-winding direction and having camming engagement with each other for shifting said drum axially with respect to the clutch element to disengage the clutch element when the drum is rotated in chain-unwinding direction.

7. In a hand brake mechanism, the combination with a worm gear; of a rotatable chain-winding drum coaxial with said worm gear; interengaging clutch means on the drum and worm gear normally operatively connecting said drum to the worm gear for rotation therewith, said drum being axially slidable to disengage said clutch means and permit rotation of the drum; a rotatable ratchet wheel coaxial with said drum; a locking pawl for holding said ratchet wheel against rotation in chain-unwinding direction; cam teeth on said drum and ratchet wheel having shouldered engagement with each other for driving said ratchet wheel when the drum is rotated in chain-winding direction and having camming engagement with each other when the drum is rotated in chain-unwinding direction to slide said drum to disengage the clutch means thereof from the clutch means of said worm gear.

8. In a hand brake mechanism, the combination with a rotary, axially slidable, chain-winding drum; of a rotary driving member coaxial with said drum; releasable clutch means operatively connecting the drum to the driving member; a rotatable ratchet element coaxial with said drum; a locking pawl for holding said ratchet element against rotation in chain-unwinding direction; and means actuated through rotation of said chain-winding drum in chain-unwinding direction with respect to said ratchet element for sliding the drum to release the clutch means.

9. In a hand brake mechanism, the combination with a worm wheel provided with clutch teeth; of a hand wheel-operated worm element for driving the worm wheel; a rotatable chain-winding drum coaxial with said worm wheel and shiftable axially toward and away from the latter, said drum having clutch teeth normally engaged with the clutch teeth of the worm wheel to be rotated in unison with the latter in both winding and unwinding directions; a rotatable ratchet wheel coaxial with said drum; a spring-pressed, pivoted locking pawl having ratcheting engagement with said ratchet wheel when rotated in chain-winding direction, and locking engagement therewith to hold the same against rotation in chain-unwinding direction; and cooperating cam teeth on said ratchet wheel and drum interlocking the drum and ratchet wheel for rotation in unison in chain-winding direction, and having camming engagement with each other during rotation of the drum in chain-unwinding direction with respect to said ratchet wheel to shift the drum to disengage the clutch teeth thereof from the clutch teeth of the worm wheel and permit rotation of the drum.

KEITH WILLIAMS.

REFERENCES CITED

The following references are of record in the file of this patent:

UNITED STATES PATENTS

| Number | Name | Date |
| --- | --- | --- |
| 1,909,952 | Haseltine | May 23, 1933 |
| 2,049,715 | Olander | Aug. 5, 1936 |